United States Patent
Feola et al.

(10) Patent No.: US 11,198,789 B2
(45) Date of Patent: Dec. 14, 2021

(54) HARDENER COMPOSITION FOR EPOXY RESIN BASED COATING COMPOSITIONS, PROCESS FOR THEIR PREPARATION AND USE THEREOF

(71) Applicant: ALLNEX AUSTRIA GmbH, Werndorf (AT)

(72) Inventors: Roland Feola, Graz (AT); Florian Lunzer, Graz (AT); Johann Gmoser, Neudau (AT); Manfred Gogg, Lieboch (AT); Alexander Spöck, Graz (AT)

(73) Assignee: ALLNEX AUSTRIA GMBH, Werndorf (AT)

( * ) Notice: Subject to any disclaimer, the term of this patent is extended or adjusted under 35 U.S.C. 154(b) by 550 days.

(21) Appl. No.: 16/086,098

(22) PCT Filed: Mar. 16, 2017

(86) PCT No.: PCT/EP2017/056202
§ 371 (c)(1),
(2) Date: Sep. 18, 2018

(87) PCT Pub. No.: WO2017/158071
PCT Pub. Date: Sep. 21, 2017

(65) Prior Publication Data
US 2020/0299536 A1    Sep. 24, 2020

(30) Foreign Application Priority Data
Mar. 18, 2016 (EP) ..................... 16161288

(51) Int. Cl.
| C09D 163/00 | (2006.01) |
| C09D 7/45 | (2018.01) |
| C08G 59/24 | (2006.01) |
| C08G 59/40 | (2006.01) |
| C08G 59/54 | (2006.01) |
| C08G 59/56 | (2006.01) |

(52) U.S. Cl.
CPC ......... C09D 163/00 (2013.01); C08G 59/245 (2013.01); C08G 59/4042 (2013.01); C08G 59/54 (2013.01); C08G 59/56 (2013.01); C09D 7/45 (2018.01)

(58) Field of Classification Search
CPC ...... C09D 163/00; C09D 7/45; C08G 59/245; C08G 59/4042; C08G 59/54; C08G 59/56

USPC ....................................... 427/427.5
See application file for complete search history.

(56) References Cited

U.S. PATENT DOCUMENTS

| 7,232,877 B2 | 6/2007 | Figovsky et al. |
| 2015/0094400 A1* | 4/2015 | Zheng .................... C08G 59/60 523/222 |
| 2015/0344706 A1 | 12/2015 | Paar et al. |
| 2016/0272823 A1 | 9/2016 | Paar et al. |
| 2016/0272824 A1 | 9/2016 | Paar et al. |

FOREIGN PATENT DOCUMENTS

| EP | 2 774 957 | 9/2014 |
| EP | 2 862 905 | 4/2015 |
| WO | 2012/150312 | 11/2012 |
| WO | 2014/072308 | 5/2014 |

OTHER PUBLICATIONS

International Search Report dated Apr. 10, 2017 in International Application No. PCT/EP2017/056202.
Written Opinion of the International Searching Authority dated Apr. 10, 2017 in International Application No. PCT/EP2017/056202.

* cited by examiner

*Primary Examiner* — David T Karst
(74) *Attorney, Agent, or Firm* — Wenderoth, Lind & Ponack, L.L.P.

(57) ABSTRACT

This invention relates to a hardener composition for an epoxy resin based two-pack coating formulation wherein the hardener composition comprises moieties having at least one structural element of formula >N-D1-NH2, and moieties having at least one structural element of formula >N-D2-NH—C(O)-Q, wherein D1 is a bivalent group, D2 is a bivalent group, and Q is a univalent group, to epoxy resin based two-pack coating formulations comprising at least one epoxy resin which is a polymer containing, on average, at least two epoxide groups per molecule, and the hardener composition, and at least one of diglycerides which are esters of glycerol with two molecules of fatty acid, monoglycerides which are esters of glycerol with one molecule of fatty acid, or glycerol, or the reaction products of at least one of diglycerides or monoglycerides or glycerol with organic compounds having at least one reactive group selected from the group consisting of acylesters, acylanhydrides, isocyanates, epoxides, cyclocarbonates, and aziridines, and to the use of these epoxy resin based two-pack coating formulations as protective coatings on metallic and mineral substrates.

16 Claims, No Drawings

HARDENER COMPOSITION FOR EPOXY RESIN BASED COATING COMPOSITIONS, PROCESS FOR THEIR PREPARATION AND USE THEREOF

FIELD OF THE INVENTION

This invention relates to a hardener composition for epoxy resin based coating compositions, to processes for their preparation, and to their use in two-pack epoxy resin compositions, especially those used for coating of metals and mineral substrates.

BACKGROUND OF THE INVENTION

Epoxy resin based coating compositions comprising multifunctional amino hardeners have been known, for example from WO 2012/150312 A1 and WO 2014/072308 A2. These documents relate to two-pack coating compositions made from aqueous dispersions comprising a multifunctional amine having more than one primary amino group per molecule, and an epoxy resin which latter is dispersed in this aqueous dispersion before use. The multifunctional amine is made in a multistep reaction wherein at first, the primary amino groups of an amine having primary and secondary amino groups are blocked by reaction with a ketone to form a ketimine. In a separate step, a chain-extended epoxy resin is made in an advancement reaction from a low molar mass difunctional epoxide compound, an aromatic diol, and a customary catalyst, optionally in the presence of the emulsifier, under removal of water. In the next step, the ketimine and, optionally, a mixture of further amines, are added to the advanced epoxy resin, and addition reaction of the amino groups to the epoxide groups under formation of hydroxyamines proceeds. Finally, water is added under stirring to the product of this step to form a dispersion, and to uncap the blocked primary amino groups, and the ketone blocking agent is distilled off. An at least difunctional epoxy resin is then added to this dispersion to form the two pack coating composition.

While such coating compositions have merit as coating agent particularly for base metals, and provide excellent corrosion protection without liberation of volatile amines during application and curing, the levelling, gloss, and especially gloss retention properties, as well as chemical resistance properties have been found to need improvement particularly when applying such coating compositions to concrete or other mineral substrates.

OBJECT OF THE INVENTION

It has therefore been the object of this invention to develop optimised hardeners for epoxy resin based coating compositions that can be used in a two-pack coating formulation which lead to coating films having excellent corrosion protection, do not liberate volatile amines during application and curing, and can also be used for concrete or other mineral substrate coating, without the drawbacks mentioned supra.

SUMMARY OF THE INVENTION

It has been found, in the experiments that have lead to the present invention, that the incorporation of certain fatty acid amidoamines having the structure of moieties M2 into hardener compositions H for epoxy resins E where the hardeners have the structure of moieties M1 as described in WO 2014/072308 A2 leads to coating compositions which provide improved appearance and chemical resistance in concrete coatings, and also on other mineral substrates. Improved corrosion protection and appearance have also been observed in coatings prepared therefrom on base metals. The invention is therefore directed to a hardener composition H which comprises
moieties M1 having at least one structural element of formula 1

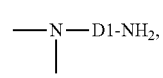

Formula 1 and
moieties M2 having at least one structural element of formula 2

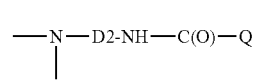

Formula 2 wherein
each of D1 and D2 is, independently of each other, a diyl group of formula 3

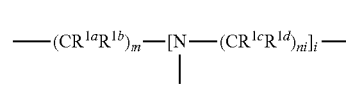

(Formula 3)

where m and all ni are, independently, integer numbers from 2 to 12, preferably from 2 to 8, and particularly preferably, from 2 to 6, and i is an integer number of from 0 to 10, preferably from 1 to 5, and particularly preferably from 1 to 3, $R^{1a}$, $R^{1b}$, $R^{1c}$, and $R^{1d}$ are independently of each other and separately for each m and ni, selected from the group consisting of H, and optionally substituted linear or branched alkyl groups having from one to six carbon atoms, or may form a ring, preferably being H, particularly preferred all being H, and Q is a univalent group which is an optionally substituted linear or branched alkyl group or alkenyl group having from five to thirty-nine, preferably from seven to thirty-six, and particularly preferably, from eleven to twenty-three carbon atoms.

In the present invention —C(O)— stands for a carbonyl group, >C=O, and

stands for a tertiary amine group in formulae 1 and 2, and for a tertiary or secondary amino group in formula 3.

Moieties M1 comprising structural elements of formula 1 comprise the known amine hardeners that have primary amino groups, such as those mentioned in WO 2012/150312 A1 and WO 2014/072308 A2 cited hereinabove. These molecules are a part of the hardener component in a two-pack coating composition.

Moieties M2 comprising structural elements of formula 2 comprise fatty acid amidoamines derived from fatty acids and/or fats or oils and amines having at least one primary amino group, and at least one secondary amino group.

As used herein, the term "moieties" stands for molecules, or parts of molecules.

The epoxy resin-based coating composition according to the invention is a two-pack coating composition comprising at least one epoxy resin E, and a hardener composition H which comprises moieties M1 having the structural elements of formula 1. The hardener H composition comprises additionally moieties M2 having structural elements of formula 2 which can be moieties M20 having the structural elements of formula 2, and which contain no structural elements of formula 1, and moieties M12 that have structural elements of both formula 1 and formula 2.

The invention therefore relates to hardener compositions H for two-pack coating compositions based on epoxy resin formulations, which hardener compositions H comprise moieties M1 and moieties M2 as defined hereinabove. The invention further relates to epoxy resin-based coating compositions comprising hardener compositions H, and to a process for preparation of the hardener compositions H according to the invention.

The hardener composition H can be used with preference for the preparation of water-borne epoxy resin paints. The invention hence further relates to a process for the preparation of a two-pack coating composition, wherein an epoxy resin component E which is a liquid epoxy resin or an aqueous dispersion of an epoxy resin, and a hardener composition H of this invention, are used as binder components; the two-pack coating compositions hereby obtained and their use in a process for coating a substrate.

DETAILED DESCRIPTION OF THE PREFERRED EMBODIMENTS

In a preferred embodiment, the epoxy resin E is selected from the group consisting of epoxy resins which are prepared by the coupling reaction of compounds containing at least two active hydrogen atoms in groups R—H with epichlorohydrin followed by dehydrohalogenation

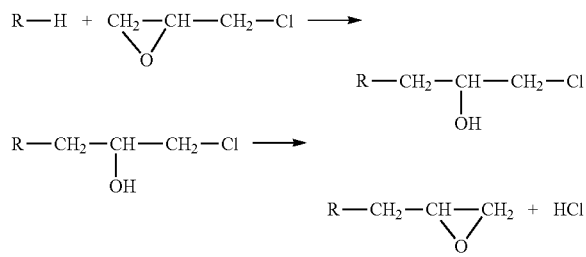

preferably by reacting phenolic compounds having at least two phenolic hydroxyl groups, monoamines and diamines, amino phenols, heterocyclic imides and amides, aliphatic diols and polyols, and dimer fatty acids with epichlorohydrin. Epoxy resins derived from epichlorohydrin are also referred to as glycidyl-based resins. Another way for synthesis is reacting diglycidyl compounds made by reaction of compounds containing at least two active hydrogen atoms in groups R—H with two molecules of epichlorohydrin, with phenolic compounds having at least two phenolic hydroxyl groups, monoamines and diamines, amino phenols, heterocyclic imides and amides, aliphatic diols and polyols, and dimeric fatty acids, in the so-called advancement reaction. Particularly preferred are epoxy resins based on bisphenol A or bisphenol F as phenolic compounds.

The moieties M1 are preferably derived from amines A4 having from two to twenty-four carbon atoms, and at least one primary amino group, and at least one secondary amino group. The amines A4 are preferably aliphatic.

Preferred are aminoalkyleneimines A41 of formula 5

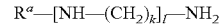 (Formula 5), where $R^a$ is H or an organic group, k is an integer number of from 2 to 12, preferably from 2 to 8, and l is an integer number of from 1 to 11, preferably from 2 to 6, more preferably from 2 to 4. If $R^a$ is H, the minimum value of l is 2.

More preferred are diaminoalkyleneimines A42 of formula 5 wherein $R^a$ is H. In this case, l is at least 2. These diaminoalkyleneimines A42 are preferably amines such as diethylene triamine, triethylene tetramine, tetraethylene pentamine, pentaethylene hexamine, etc., and their $C_3$- to $C_6$-analogues, such as dipropylene triamine, tripropylene tetramine, dibutylene triamine [N-(4-aminobutyl)butane-1,4-diamine], tributylene tetramine [N,N'-bis (4-aminobutyl)-1,4-butanediamine], bis-hexamethylene tri-amine [1,13-di-amino-7-azatridecane, N-(5-aminohexyl)-1,6-hexanediamine], tris-hexamethylene tetramine [N,N'-bis (6-amino-hexyl)-1,6-hexanediamine], and N-(4-amino-cyclohexyl)-1,4-cyclo-hexanediamine. Particularly preferred are diethylene triamine, triethylene tetramine, tetraethylene pentamine, 1,5-diamino-2,4-dimethyl-3-azapentane and its isomers, 1,7-diamino-4-azaheptane, 1,9-diamino-5-azanonane, 1,14-diamino-5,10-diazatetradecane, 1,13-diamino-7-azatridecane, and 1,20-diamino-7,14-diazaeicosane. Mixtures of these diamino-alkyleneimines A42 can also be used.

Amines A4 having at least two, preferably two, primary amino groups and one secondary amino group, or mixtures of such amines A4 are particularly preferred.

The hardeners according to the present invention comprising moieties M1 are preferably prepared by reacting amines A4 with blocking carbonyl compounds B selected from the group consisting of ketones, aldehydes, and their mixtures, preferably ketones, to form a Schiff base structure, >C=N—, by condensation of a primary amino group —NH$_2$ with a carbonyl group >C=O, under consumption of the primary amino group(s) and conservation of the at least one secondary amino group present, and reacting this blocked amine A4B with an at least difunctional organic compound C1 having functional groups that are reactive versus secondary amino groups, to form an addition or condensation product C1(A4B)$_x$, where x is the functionality of C1, in the case that the blocked amine A4B has one secondary amino group per molecule. If there are two secondary amino groups in each molecule of the amine A4B, and two functional groups in C1 that are reactive versus secondary amino groups, a chain polymer or oligomer can be formed, as is known from polyamides or polyesters derived from difunctional monomers having —COOH and —NH$_2$ functionalities in the case of a polyamide, or —COOH and —OH functionalities in the case of a polyester.

If there are three or more secondary amino groups in the blocked amines A4B, chain branching can occur in the reaction with difunctional compounds C1 which is tolerable for low degrees of polymerisation such as ten or less, preferably five or less. Gelation has been found to set in if higher polymers are formed. The average degree of polymerisation is defined, as usual, as the average number of repeating units of one of the constituents per molecule, and can be determined according to the usual methods, most conveniently by high pressure gel permeation, or size exclusion, chromatography using appropriately prepared standard molecules.

Moieties M2 are preferably derived from amines A3 which are independently selected from the same group as described for the amines A4 hereinabove, and A3 and A4 may be the same, or may be different from each other. Preferred amines A3 are aminoalkyleneimines A31 which are independently selected from the same group as has been described in relation to the amines A41. More preferred are diaminoalkyleneimines A32 which are independently selected from the same group as has been described for the amines A42 hereinabove.

The hardeners according to the present invention comprising moieties M2 are preferably prepared by reacting a fatty acid F with an amine A3, under formation of the amine salt, and subsequent liberation of water upon heating, in a stoichiometric ratio of carboxyl groups to primary amino groups, n(—COOH):n(—NH$_2$) of close to 1 mol/mol, preferably between 0.98 mol/mol to 1.02 mol/mol, thereby forming a fatty acid amidoamine A3F preferably by consumption of only the primary amino groups, and preservation of the secondary amino groups. The resulting fatty acid amidoamine A3F generally has at least one secondary amino group, and at least one fatty acid amide group in its molecule, and has the structure of formula 7

$$R^5\text{—CO—NH—}R^4 \qquad \text{(Formula 7)}$$

where the fatty acid F has the structure $R^5$—CO—OH, and the amine A3 has the structure $R^4$—NH$_2$, where $R^5$ is an alkyl or alkenyl group, and $R^4$ is an organic group having at least one secondary amino group. The alkyl or alkenyl group $R^5$ is preferably an aliphatic linear or branched group, that may have an additional carboxyl group or hydroxyl group. The $R^5$ group has preferably from five to thirty-nine, more preferably from eleven to twenty-three, carbon atoms. The organic group $R^4$ is preferably a linear or branched aliphatic group having from two to twenty-four carbon atoms, preferably from four to eighteen carbon atoms, and at least one secondary amino group. The stoichiometry is preferably chosen such that the ratio of the amount of substance of primary amino groups n(NH$_2$,A3) in the amine A3 and the amount of substance of carboxylic acid groups n(COOH,F) in the fatty acid F is from 0.95 mol/mol to 1.05 mol/mol, particularly preferably from 0.98 mol/mol to 1.02 mol/mol. It is most preferred to use amines A32 which are selected from the diamino-alkyleneimines as detailed in the preceding paragraph.

This fatty acid amidoamine A3F is then reacted with an at least difunctional organic compound C2 having functional groups that are reactive versus secondary amino groups, to form an addition or condensation product C2(A3F)$_y$, where y is the functionality of C2, in the case that the fatty acid amidoamine A3F has one secondary amino group per molecule. If there are two secondary amino groups in each molecule of the fatty acid amidoamine A3F, and two functional groups in C2 that are reactive versus secondary amino groups, a chain polymer or oligomer can be formed, as is known from polyamides or polyesters derived from difunctional monomers having —COOH and —NH$_2$ functionalities in the case of a polyamide, or —COOH and —OH functionalities in the case of a polyester.

Amines A3 having two secondary amino groups, or mixtures of amines A3 having, on average, two secondary amino groups per molecule are particularly preferred.

If there are three or more secondary amino groups in the amines A3, chain branching can occur during reaction with C2 which is tolerable for low degrees of polymerisation such as 10 or less, preferably 5 or less. Gelation has been found to set in if higher polymers are formed. The average degree of polymerisation is defined, as usual, as the average number of repeating units of one of the constituents per molecule, and can be determined according to the usual methods, most conveniently by high pressure gel permeation, or size exclusion, chromatography using appropriately prepared standard molecules.

According to a preferred embodiment, the hardeners according to the invention are prepared by reacting a mixture of the reaction products A4B and A3F with an at least difunctional organic compound C having functional groups that are reactive versus secondary amino groups, to form a mixed addition or condensation product. This product can be designated as C(A3F, A4B)$_z$, where z is the functionality of C, in the case that both the fatty acid amidoamine A3F and the amine A4B have one secondary amino group per molecule. The mixture of the reaction products A4B and A3F may also comprise diglycerides, monoglycerides, or glycerol, or a combination of these, as detailed below.

The fatty acids F are generally aliphatic linear or branched carboxylic acids and have preferably at least one, and preferably not more than two, carboxyl groups per molecule. They have preferably from six to forty, more preferably from twelve to thirty-six, most preferably from twelve to twenty-four, carbon atoms and may carry a hydroxyl group, and may also have one or more carbon-carbon double bonds. Preferred fatty acids are lauric acid, myristic acid, palmitic acid, stearic acid, arachidic acid, and also unsaturated fatty acids such as palmoleic acid, oleic acid, and gadoleic acid, and linoleic and linolenic acid. Mixtures of fatty acids can also be used, particularly those which are available from natural sources such as linseed oil fatty acid, castor oil fatty acid, soy bean oil fatty acid, and tall oil fatty acid. It is also possible to use, in such mixtures, the so-called dimer fatty acids which are made by dimerisation of unsaturated fatty acids such as those mentioned supra, the most common is a C$_{36}$ diacid.

Use of a dimer fatty acid which has two carboxylic acid groups, in contrast to fatty acids such as tall oil fatty acid that is a mixture of monocarboxylic acids, with an amine component having only one secondary amino group with the stoichiometry of one mole of dimer fatty acid with two moles of a diprimary monosecondary amine, such as diethylenetriamine having one secondary and two primary amino groups, leads to formation of a reaction product that comprises a major part of condensation products comprising one moiety derived from a dimer fatty acid, and two moieties derived from the amine component where on average, two primary and two secondary amino groups remain. This product is then preferably reacted in the same reaction vessel, as a "one-pot" reaction with additional two moles of a (monocarboxylic) fatty acid or mixtures thereof, such as tall oil fatty acid, to yield a reaction product comprising moieties derived from one molecule of dimer fatty acid, from two molecules of the amine component, and from two molecules of monocarboxylic fatty acid. The reaction product thus obtained has at least a portion of molecules having two secondary amino groups per molecule, which have a larger distance from each other than in the case of using a condensation product of two moles of (monocarboxylic) fatty acids and one mole of a diprimary disecondary amine component.

In a preferred embodiment, the hardeners according to the invention are obtained from a fatty acid amide A3F which has at least one secondary amino group and at least one fatty acid amide group in its molecule which in turn is obtained by reaction of a fat or a fatty oil, both individually or collectively abbreviated as "O", with an amine A3 which has at least one primary amino group and at least one secondary amino group as described hereinabove, under formation of fatty acid amide A3F, and concurrent formation of a diglyceride, a monoglyceride and/or glycerol, or mixtures thereof, according to the stoichiometry chosen.

Fats and fatty oils O are generally substantially triglycerides $F_3G$, i. e. tri-esters of glycerol G and three molecules of fatty acids F which may be the same in each of the ester bonds, or may be different. In naturally occurring fats and fatty oils, the mass fraction of triglycerides $F_3G$ is usually at least 96%. In lower amounts, such as mass fractions of up to 3% of diglycerides $F_2G$, and up to 1% of monoglycerides $F_1G$, which are partial glycerol esters that carry one or two non-esterified hydroxyl groups, can also be found in natural fats or fatty oils. Depending on the fatty acids occurring in the natural fats or fatty oils, these may have olefinic unsaturation, or may have additional functionalities, such as castor oil which is rich in ricinoleic acid, a monounsaturated linear aliphatic acid of eighteen carbon atoms, having a hydroxyl group at the carbon atom in position 12. Preferred oils are those with an iodine number of from 50 g/hg to 200 g/hg, particularly preferred, from 60 g/hg to 190 g/hg, and especially preferred, from 70 g/hg to 180 g/hg. Particularly preferred are linseed oil, castor oil, soy bean oil and tall oil.

When fats or fatty oils O are reacted with amines A3, a transesterification-transamidation reaction occurs which generates a free hydroxyl group on the glycerol molecule which is part of the ester, for a primary amino group of the amine; secondary amino groups being much less reactive in this reaction. For example, by reaction of one molecule of an amine A3 having the structure $R^4$—$NH_2$ having only one primary amine group with one molecule of a triglyceride $F_3G$ having the structure of formula 8:

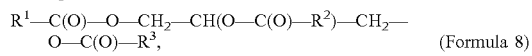  (Formula 8)

wherein each of $R^1$, $R^2$ and $R^3$, individually, is a $R^5$ group as defined supra,
a fatty acid amide A3F is formed, having the structure, e. g., $R^1$—CO—NH—$R^4$, and a diglyceride $F_2G$ is simultaneously formed which has one reactive hydroxyl group, of the structure of formula 9 (a primary hydroxyl group in the glycerol part of the resulting diglyceride is preferentially formed):

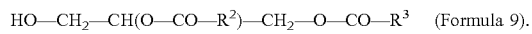  (Formula 9).

Depending on the stoichiometry, glycerol, and monoglycerides $F_1G$, and also unreacted tri-glycerides $F_3G$ can also be present in the product of this reaction. Therefore, the relative amounts of diglycerides $F_3G$, monoglycerides $F_3G$, and glycerol in the resulting product mixture change with a change in the ratio of the amount of substance of primary amino groups in A3 to the amount of substance of ester groups in the triglycerides used in the reaction.

The stoichiometry is preferably chosen such that the ratio of the amount of substance of primary amino groups n($NH_2$, A3) in the amine A3 to the amount of substance of carboxylic acid ester groups n(COO—,F) in the oil O is from 0.2 mol/mol to 1.0 mol/mol, more preferably from 0.3 mol/mol to 0.9 mol/mol, most preferably from 0.33 to 0.7 mol/mol.

It has been found that diglycerides $F_2G$ and/or monoglycerides $F_1G$, and even small amounts of glycerol G, formed in this reaction do not have to be isolated from the fatty acid amide A3F and can be, advantageously, used together with the fatty acid amide A3F in the further reaction of this pro-duct with compound C or C2. The presence of these diglycerides $F_2G$ or monoglycerides $F_1G$, and their reaction products with compounds C or C2 in the hardener composition H leads, surprisingly, to coatings with superior gloss and chemical resistance, when compared to paints with fatty acid amide A3F made directly from fatty acids F with the amine A3, and no diglycerides $F_2G$ or mono-glycerides $F_1G$ being present. It is therefore also possible to increase gloss and chemical resistance by adding diglycerides $F_2G$ or monoglycerides $F_1G$ or also glycerol, or their reaction products with compounds C or C2, to the hardener composition H, or to the epoxy resin E, or to both.

Diglycerides $F_2G$, monoglycerides $F_1G$, and glycerol can also take part in the subsequent reaction with compound C or C2, due to their hydroxyl functional group(s). The reaction product mixture obtained in the synthesis of C(A3F, A4B)$_z$ therefore also comprises moieties derived from the reaction of mono- and/or diglycerides and compound C. Likewise, the reaction product mixture obtained in the synthesis of A3FC2 also comprises moieties derived from the reaction of mono- and/or diglycerides and compound C2.

If fatty acid amides A3F obtained from the reaction of a fatty acid F with an amine A3 are used, it is of course also possible to add a further amount of glycerides, especially di- and/or monoglycerides before or during the reaction of the fatty acid amide AF3 with the compound C or C2.

In a variant, it is also possible to use, instead of the amines A4, or together with these in a mixture, amines A4' where the secondary amino groups of A4 are partially or completely replaced by reactive groups R selected from the group consisting of hydroxyl groups, thiol groups, acid groups, and amide groups, more preferred hydroxyl groups. In a further variant, it is also possible to use, instead of the amines A3, or together with these in a mixture, amines A3' where the secondary amino groups of A3 are partially or completely replaced by reactive groups R selected from the group consisting of hydroxyl groups, thiol groups, acid groups, and amide groups, more preferred hydroxyl groups. In a still further variant, it is also possible to use, instead of the both amines A4 and A3, or together with these in a mixture, amines A4' and A3'. When using such variants, it is of course needed to adapt the stoichiometry according to the choice of reactive groups R.

The blocking agents B are carbonyl functional compounds selected from aldehydes and ketones or mixtures of these. Ketones are more preferred than aldehydes. Preferred are aliphatic ketones B having at least three carbon atoms, and preferably not more than ten carbon atoms. Useful blocking agents are acetone, methylethylketone, diethylketone, and methylisobutyl-ketone. Particularly preferred are methylisobutylketone and methylethylketone.

The relative amounts of amine A4 and blocking agent B is generally such that at least 99%, preferably about 100%, of primary amine groups react with the blocking agent B under formation of a Schiff base structure >C=N— from a carbonyl group of the blocking agent B, and a primary amino group of the amine A4.

Generally, a slight excess of blocking agent B can be used. Preferably a stoichiometric amount of amine A4 and blocking agent B are used. A stoichiometric quantity or a stoichiometric amount shall mean, in the context of this invention, the exact amount needed to complete an intended chemical reaction. With reference to the unblocking of a blocked primary amine which is present in the form of a Schiff base having the structure $R^aR^b\,C{=}N{-}R^c$, where $R^aR^b\,C{=}O$ is a carbonyl compound which can be a ketone or an aldehyde, and $H_2N{-}R^c$ is a primary amine, $R^a$, $R^b$, and $R^c$ standing for the organic residues of the carbonyl compound and of the primary amine, the stoichiometric amount of water to hydrolyse the Schiff base is 1 mol for each 1 mol of the primary amine residue $>N{-}R^c$ in the Schiff base.

It is particularly preferred to use an amine A4 which is a di-primary mono-secondary amine, and an amine A3 which is a di-primary di-secondary amine.

The compounds C, C1 and C2 can be, independently from each other, chosen from any organic compound which has at least one reactive group, preferably at least two reactive groups, selected from the group consisting of acylesters, acylanhydrides, isocyanates, epoxides, cyclocarbonates, and aziridines, preferred being epoxides, aziridines, and cyclocarbonates, by which reactive group it is able to react with the secondary amino groups of amine A4 and the amine A3. Compounds that have two or more reactive groups of the same kind, such as two or more epoxide groups, or two or more cyclocarbonate groups, are referred to as "multifunctional", in the context of this invention and are preferred.

The compounds C, C1 and C2 serve several purposes in this invention, their functional groups react with the secondary amino group, or other functional group in the case of an amine A4' or an amine A3' being used instead of, or together with, the amines A4 and A3, of the reaction products A3F and A4B, thereby enlarging the molecule which decreases the vapour pressure of the reaction product. Compounds C and C1 having more than one reactive group that reacts with the functional group of the amines A4B which is not a primary amino group lead to an increase in the number of unblocked primary amino groups in the amino hardener composition H which leads to improved crosslinking efficiency. And further, choosing compounds C, C1 and/or C2 to comprise structural elements of an epoxy resin enhances the compatibility of its reaction products with the epoxy resin component of the binder, or choosing compounds C, C1 and/or C2 to comprise both hydrophobic and hydrophilic portions in their molecules enhances the stability of the dispersions formed. The presence of secondary amino groups in the amines A3 or A4 provides the advantage that such compounds are readily available on a technical scale, and supplies a functional group of good reactivity.

With preference, the multifunctional compounds C, C1 and C2 are selected from the group consisting of glycidyl ethers of at least dihydric phenols, of glycidyl ethers of at least dihydric aliphatic or cycloaliphatic alcohols, the cyclocarbonates made from these glycidyl compounds by addition of carbon dioxide thereto, such as described in U.S. Pat. No. 7,232,877, and multi-functional aziridines which are preferably derived from multifunctional alcohols, such as trimethylolpropane tris(2-methyl-1-aziridinepropionate), pentaerythritol tris-[3-(1-aziridinyl)-propionate], and from multifunctional acids, such as N,N'-bis-propylene-adipic acid amide (BPAA), 1,1'-azelaoyl-bis-(2-methylaziridine) (ABMA), and N,N',N",N'''-tetra-propylene-1,2,3,4-butane-tetracarbonic acid amide (TPBA).

More preferably, the multifunctional compounds C, C1 and C2 are chosen from epoxide-functional epoxy resins, and with preference from the glycidyl ethers of an epoxy resin having at least one repeating unit (n=0), according to the formula 10

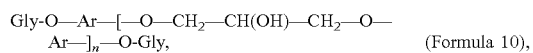  (Formula 10), where n is an integer number of at least 0, Ar is an arylene group and may preferably be 1,3- or 1,4-phenylene, 2,2-di (phenyl-4-yl)propan, di(phenyl-4-yl)methan, di(phenyl-4-yl)sulphone, and Gly-stands for glycidyl of formula 11,

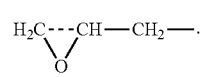  (Formula 11)

Such epoxide functional epoxy resins can be made by the reaction of an epoxide functional compound having at least two epoxide groups, such as a diglycidyl ether of a bisphenol, with a bisphenol compound, in an advancement reaction. In the process according to the invention, such resins can be made just prior to their reaction with A3F and/or A4B.

Preferred compounds C, C1 and C2 are therefore those compounds that firstly, react readily with secondary amino groups that are present in A3F and A4B, and other functional groups that may be present in a mixture comprising A4B, and those compounds which secondly also comprise structural elements that are compatible with the epoxy resin components that are used in the coating compositions of the present invention. Particularly preferred are, therefore, as epoxy resins, compounds having glycidyl groups as reactive groups, and moieties derived from bisphenol A or other di- or multifunctional hydroxy compounds such as bisphenol F (bis-(4-hydroxy-phenyl)methane), or novolak derivatives, when epoxy resins based on the mentioned bisphenols and novolak derivatives are used in the coating compositions of the present invention. A particularly preferred class of compounds C, C1 and C2 is one that has both structural elements compatible with epoxy resins, and hydrophilic moieties, such as reaction products of polyethylene glycol with a diglycidyl ether of a bisphenol where the molecules of the reaction products can further be enlarged by an advancement reaction. Increasing the size of the molecules would improve the compatibility with epoxy resins, and also further reduce the volatility of the reaction products.

Particularly preferred compounds C, C1 and C2 are epoxide functional epoxy resins having a specific content of epoxide groups of from 2 mol/kg to 5.5 mol/kg.

As the compounds C2 obey the same definition as the compounds C1, they may be the same, or may be different from these. Using the same compounds for C1 and C2 is particularly useful if the reaction of these compounds with the amine compounds are conducted at the same time, in the same vessel.

When preparing a two-pack water-borne epoxy resin coating composition, the presence of an emulsifier S in either or both of the hardener composition H, and the epoxy resin component E, can be useful to increase the mass fraction of binder components in the final water-based epoxy resin coating composition. When present in the hardener composition H, the emulsifier S may be admixed to the hardener composition H or at least one of its constituents, or may be chemically incorporated into at least one of the constituents of the hardener composition H, or may both be chemically incorporated, and admixed.

The emulsifier S can be non-ionic, anionic, cationic, amphoteric, and zwitterionic.

A preferred class of emulsifiers S are nonionic emulsifiers Sn such as those made by reaction of low molar mass epoxy resins which are preferably derived from bisphenol A or bisphenol F or their mixtures, preferably having two epoxide groups per molecule, and from one to ten repeating units, and dihydroxy polyoxyethylene, also known as polyethylene glycol. This reaction is preferably catalysed by a Lewis acid such as boron trifluoride, or complexes of boron trifluoride with Lewis bases such as with ammonia or trimethylamine. A preferred non-ionic emulsifier Sn is made by reacting a glycidylether, preferably bisphenol A diglycidylether, with dihydroxy polyoxyethylene $(POE)(OH)_2$ preferably under catalysis, where the dihydroxy polyoxyethylene (POE) $(OH)_2$ has a mass average molar mass $M_w$ of from 1 kg/mol to 40 kg/mol, as determined by size exclusion chromatography using dihydroxy polyoxyethylene standards (available, i. a., from Agilent Technologies Inc.), particularly preferred of from 2 kg/mol to 20 kg/mol. Mixtures of two or more different dihydroxy polyoxyethylenes $(POE)(OH)_2$ and/or mixtures of two or more different low molar mass epoxy resins may also be used. It is also possible to replace a part, preferably not more than 40%, of the oxyethylene groups in the dihydroxy polyoxyethylenes $(POE)(OH)_2$ by oxypropylene groups, in statistical distribution, or in blockwise distribution.

If at least one of C, C1 and C2 is epoxide-functional, it is particularly preferred to chemically incorporate at least a part of this preferred class of non-ionic emulsifiers Sn into one or more of the reaction products C(A4,A3F), A3FC2 and A4C1 to make self-emulsifying materials of these, prior to their reaction with the compounds A3F and/or A4B. In this case, an intermediate is preferably first made by reacting a dihydroxy polyoxyethylene $(POE)(OH)_2$ with a digycidyl-functional compound preferably under acid catalysis, preferably with a Lewis acid, and then reacting the adduct thus obtained in an optionally catalysed advancement reaction with di- or multihydric phenolic compounds P which are selected from the group consisting of dihydroxy-aromatic compounds, dihydroxy aromatic-aliphatic compounds, and multihydroxyaromatic compounds based on novolaks, and a further amount of at least one of epoxide-functional components C, C1 and C2, wherein the further amount of C, C1 or C2 is preferably chosen such that the additional amount of substance of epoxide groups in this further amount is at least the same as the additional amount of substance of hydroxyl groups added by the hydroxy-functional phenolic compounds P. With preference, these phenolic compounds P are selected from the group consisting of bisphenol A, bisphenol F, and novolaks. In a preferred embodiment, steps (c') and (c") are conducted together in this case. A compound C that has both hydrophilic moieties preferably derived from polyoxyethylene and moieties derived from epoxy resins serves both purposes of providing the hardener composition with the effect of an emulsifier, and the effect of a compatibiliser with an epoxy resin binder component.

The emulsifier S may also be a combination of a nonionic (Sn) and an anionic (Sa) or cationic (Sc) emulsifier. Further non-ionic emulsifiers Sn which can be used for this invention are preferably selected from the group consisting of monoesters of glycerol and fatty acids, ethoxylated fatty acids, ethoxylated fatty acid amides, ethoxylated fatty alcohols, ethoxylated alkyl phenols. Anionic emulsifiers Sa which can be used for this invention are preferably selected from the group consisting of fatty acid salts, alkanolsulfates, fatty alcohol isethionates, alkali alkanesulfonates, alkylbenzene sulphonates, sulfosuccinic acid esters, alkanol ethoxylate-sulfates, and alkanol ethoxylate-phosphates. Cationic emulsifiers Sc which can be used for this invention are tetraalkyl ammonium halogenides where at least one of the alkyl groups has from eight to forty carbon atoms, while the others preferably have from one to eight carbon atoms, quaternary carboxymethylated ammonium salts, and long chain alkyl substituted pyridinium salts such as lauryl pyridium chloride. Preferred are combinations of anionic and non-ionic emulsifiers, and combinations of cationic and non-ionic emulsifiers. Among the preferred combinations, it is particularly preferred to combine a self-emulsifying amino-functional epoxy-amine adduct of the C(A4,A3F) or A4C1 structure with one or more added emulsifiers which can be an anionic emulsifier or a cationic emulsifier, or an amphoteric emulsifier, each optionally in combination with one or more separate non-ionic external emulsifiers.

The hardener composition H according to the invention can be prepared in a multi-step process, comprising
   a step (step (a)) preparing a fatty acid amide A3F,
   a separate step (step (b)) preparing a blocked amine A4B, and
   a step (step (c)) wherein the acid amide A3F and the blocked amine A4B are reacted with a compound C under reaction with the secondary amino groups in A3F and A4B, or the other reactive groups in A3'F and the blocked amine A4'B, and
   a step (step (d)) wherein the blocking agent B is removed such that primary amino groups are liberated.

In the process according to the invention, step (a) can be performed by reacting a fatty acid F with the amine A3. Step (a) is preferably performed in a modified manner by reacting an oil or fatty oil (O) with the amine A3. In this case the diglycerides and monoglycerides, as well as the glycerol that may be formed in this reaction, can be left in the reaction mixture obtained in step (a) for further use in step (c) as explained in the following. If the hardener composition H is to be used in an aqueous, or water-borne, two-pack coating composition, the emulsifier S is added in any of the process steps unless, of course, it impairs the chemical reaction in a particular step in which case it is added after such step.

In a first preferred embodiment, the hardener composition H is prepared in a multi-step process, wherein
   in step (a), the amine A3 as defined hereinabove having at least one secondary amino group and at least one primary amino group, is reacted with the fatty acid F as defined hereinabove to form a fatty acid amide A3F, where the stoichiometry is preferably chosen such that the ratio of the amount of substance $n(NH_2)$ of primary amino groups in the amine A3 to the amount of substance of carboxyl groups n(COOH) in the fatty acids F is between 0.9 mol/mol and 1.0 mol/mol, more preferably about 1 mol/mol, to obtain a fatty acid amide A3F having at least one secondary amino group >NH and where preferably all primary amino groups of the amine A3 are converted to amido groups —CO—NH—,
   in step (b), a blocked amine A4B is prepared separately by reacting the amine A4 as defined hereinabove having at least one primary amino group —$NH_2$ and at least one secondary amino group with the carbonyl-functional blocking agent B as defined hereinabove under formation of a Schiff base structure >C═N— from a carbonyl group >C═O of the blocking agent B, and a primary amino group —$NH_2$ of the amine A4, wherein the stoichiometry in this reaction step is chosen such that the number of carbonyl groups in the blocking agent B is at least equal to the number of primary amino groups —$NH_2$ in the amine A4,
   in step (c'), the blocked amine A4B of step (b) is reacted with the compound C1 as defined hereinabove which has at least one reactive group selected from the group consisting of acylester, acyl-anhydride, isocyanate, epoxide, cyclocarbonate, and aziridine, under formation of an adduct A4BC1 that has blocked primary amino groups, wherein the stoichiometry in this reaction step is preferably chosen such that the ratio of the amount of substance of reactive groups in compound C1 and the amount of substance of secondary amino groups in the amine A4 is between 1 mol/mol and 1.1 mol/mol, under formation of an adduct A4BC1 that has at least one blocked primary amino group in the form of a Schiff base structure >C=N—, in step (c"), the acid amide A3F of step (a) is reacted with the compound C2 as defined hereinabove which has at least one reactive group selected from the group consisting of acylester, acylanhydride, isocyanate, epoxide, cyclocarbonate, and aziridine, wherein the stoichiometry in this reaction step is preferably chosen such that the ratio of the amount of substance of reactive groups in compound C2 and the amount of substance of secondary amino groups in the amine A3 is between 0.9 mol/mol and 1.1 mol/mol, under formation of an adduct A3FC2 that has at least one fatty acid amide group —CO—NH—, in step (d), the Schiff base structure of the adduct A4BC1 is decomposed by addition of at least a stoichiometric amount of water to the product of step (c'), and cleavage of the bond formed with the carbonyl compound B, to form an amino-functional adduct A4C1 having free primary amino groups, and in step (e), the products of reaction step (c') or (d) are mixed with the product of reaction step (c"), wherein, optionally, an emulsifier S is admixed to at least one of steps (c'), (c"), (d), and (e), and optionally dispersing this mixture in water. In a preferred embodiment, the products of steps (c') and (c") are combined before step (d).

The mass ratio of products A4C1 and of products A3FC2, m(A4C1):m(A3FC2) is preferably from 1.5 kg: 1 kg to 2.7 kg: 1 kg.

In a variant of this first embodiment, at least one of glycerides FG of fatty acids F which are esters of less than three, and at least one, molecules of fatty acids F with one molecule of glycerol G, preferably mono- and/or diglycerides, is admixed before at least one of steps (c), (c'), (c"), (d) and (e), or after step (e). If such admixing is made, the amount of compounds C, C1, and C2 may be increased in steps (c), (c') and (c") to allow at least partial reaction of the glycerides FG with compounds C, C1, and C2, by virtue of their reactive hydroxyl groups.

The mass fraction of glycerides FG in the hardener composition H including the glycerides, calculated as the ratio of the mass m(FG) of glycerides FG, divided by the mass m(H) of the hardener composition H is preferably not exceeding 12% (0.12 kg/kg). These masses, of course, do not include those of solvents or diluents.

In a second, preferred, embodiment, the present invention relates to an hardener composition H prepared in a multi-step process and to a multistep process, wherein in step (a), an amine A3 having at least one secondary, and at least one primary amino group, is reacted with a fat or fatty oil O which comprise a tri-ester of glycerol G and fatty acids F which may be the same in each of the ester bonds, or may be different, to form a mixture of an fatty acid amide A3F and a mixture of glycerides of fatty acids F which are esters of less than three, and preferably at least one, molecules of fatty acids F with one molecule of glycerol G, where the stoichiometry is preferably chosen such that the ratio of the amount of substance $n(NH_2)$ of primary amino groups in the amine A3 to the amount of substance of fatty acid residues n(F) in the fats or fatty oils O is between 0.3 mol/mol and 1.0 mol/mol, (i.e. equivalent to the ratio of the amount of substance $n(NH_2)$ of primary amino groups in the amine A3 to the amount of substance of glycerol n(G) in the fats or fatty oils O of from 0.9 mol/mol to 3.0 mol/mol) to obtain a fatty acid amidoamine A3F together with di- and/or monoglycerides of fatty acids F, in step (c"), the mixture of fatty acid amide A3F and di- and/or monoglycerides of fatty acids F of step (a) is reacted with a compound C2 which has at least one reactive group selected from the group consisting of acylester, halogenide, acylanhydride, isocyanate, epoxide, cyclocarbonate, and aziridine, wherein the stoichiometry in this reaction step is preferably chosen such that the ratio of the amount of substance of reactive groups in compound C2 and the amount of substance of secondary amino groups in the amine A3 is between 0.9 mol/mol and 1.3 mol/mol, more preferably between 0.9 mol/mol to 1.1 mol/mol;

steps (b), (c'), (d) and (e) are conducted as described hereinabove in relation to the first embodiment.

In third, preferred, embodiment, the hardener composition H is prepared in a multi-step process and to a multistep process, wherein:

step (a) is conducted as described hereinabove in relation with the first embodiment;

step (b) is conducted as described hereinabove in relation with the first embodiment;

in step (c), at least one compound C is reacted with a mixture of fatty acid amide A3F and di- and/or monoglycerides of fatty acids F of step (a) and with the blocked amine A4'B of step (b), under formation of an adduct C(A4'BA3F) that has blocked primary amino groups, wherein the stoichiometry in this reaction step is preferably chosen such that the ratio of the amount of substance of reactive groups in compound C and the total amount of substance of secondary amino groups in the amines A3F and further functional groups R in blocked amine A4'B is between 0.9 mol/mol and 1.1 mol/mol, more preferably between 1 mol/mol and 1.1 mol/mol;

in step (d'), the Schiff base structure of the adduct C(A4'BA3F) is decomposed by addition of a stoichiometric amount of water to the product of step (c), and cleavage of the carbonyl compound B, to form an amino-functional adduct C(A4'A3F) having free primary amino groups, and wherein, optionally, an emulsifier S is admixed to at least one of steps (c) and/or (d'), and optionally dispersing this amino-functional adduct C(A4'A3F) in water.

Step (a) and step (b) in the process descriptions supra may be conducted in any sequence, i. e. at the same time, or one after the other. The product of step (a) is used in step (c") or in step (c), and the product of step (b) is used in step (c') or in step (c). Therefore, step (a) must precede step (c") or step (c), and step (b) must precede step (c') or step (c). Step (c') and step (c") may also be conducted in any sequence, i. e. at the same time, or one after the other. Step (d) must follow step (c') or step (e). Step (d') must follow step (c).

In a preferred variant of the embodiments described hereinabove, in at least one of the steps (c), (c") and (c'), the reaction with the compound C, C1 or C2, respectively, may be made in the presence of at least one of a first additional secondary amine A1 which is selected from the group consisting of dialkylamines having from one to twelve carbon atoms in the alkyl group, and of hydroxyfunctional secondary aliphatic amines, preferably bis(hydroxyalkyl) amines having from two to six carbon atoms in the hydroxyalkyl group. Particularly preferred as amines A1 are diethylamine, dipropylamine, dibutylamine, diethanolamine, di-n-propanolamine, and diisopropanolamine, or their mixtures.

In a variant of the embodiments described hereinabove, in at least one of the steps (c), (c") and (c'), the reaction with the compound C, C1 or C2, respectively, may be made in the presence of at least one of a second additional amine A2 which is selected from the group consisting of polyfunctional aliphatic amines having at least one tertiary amino group per molecule and at least one primary amino group per molecule, preferably N,N-dialkylamino alkyleneamines having from one to four carbon atoms in the alkyl groups, and from two to six carbon atoms in the alkylene group. Particularly preferred as amines A2 are N,N-dimethylaminoethylamine, N,N-dimethylamino-propylamine, N,N-dimethylaminobutylamine, N,N-diethylaminoethylamine, N,N-diethylamino-propylamine, and N,N-diethylaminobutylamine, and their mixtures.

If only one of A1 and A2 is present together with A4B and/or A3F, the sum of mass fractions of A4B and A3F in the mixture of A4B, A3F, and A1 or A2, is at least 60%, preferably at least 70%, and the mass fraction of A1 or A2 in this mixture is not more than 40%, preferably not more that 30%. If both A1 and A2 are present together with A4B and A3F, the sum of mass fractions of A4B and A3F in the mixture of A4B, A3F, A1 and A2 is at least 50%, preferably at least 60%, the mass fraction of A1 is not more than 30%, preferably not more than 25%, and the mass fraction of A2 is not more than 20%, preferably not more than 15%.

If one or more of the amines A1 and A2 are present together with A4B and/or A3F, the amounts of compounds C1, C2 and/or C, used in steps (c), (c") and (c'), are adapted such that the stoichiometry in this reaction step is preferably chosen such that the ratio of the amount of substance of reactive groups in compound C and the total amount of substance of secondary amino groups in the amines A3F and in blocked amine A4B, secondary amino groups in the first additional secondary amine A1 and primary amino groups in second additional amine A2, is between 0.9 mol/mol and 1.3 mol/mol, more preferably between 1 mol/mol and 1.1 mol/mol.

In a preferred variant of the embodiments described hereinabove, and especially when C, C1 and/or C2 are epoxy-functional, at least part of the preferred class of non-ionic emulsifiers S is chemically incorporated in the amino hardener composition. It is particularly preferred to chemically incorporate at least part of this preferred class of non-ionic emulsifiers S into one or more of the reaction products A4A3FC, A3FC1 and A4C2 to make these self-emulsifying materials. In this case, it is preferred to react at least part of the emulsifier S with at least one of the compounds C, C1 and/or C2 and the phenolic prior to their reaction with the compounds A3F and/or A4B. The mass fraction of the non-ionic emulsifier S is calculated as the ratio m(S)/m(H) of the mass m(S) of the non-ionic emulsifier S, and the mass m(H) of the hardener composition H comprising this emulsifier, is preferably at least 5%, particularly preferably at least 8%; it does generally not exceed 12%. These masses, of course, do not include those of solvents or diluents.

In step (a), it is preferred to use fats or fatty oils O rather than fatty acid F to prepare the fatty acid amidoamines. This has the advantage that no water is liberated in the reaction to form fatty acid amidoamines, and that lower temperatures can be used. It has further been found, surprisingly, that the coatings prepared by using fats or fatty oils in step (a) have better gloss and better chemical resistance than coatings prepared with fatty acid amidoamines made directly from fatty acids and amines. The best results have been obtained by using castor oil to prepare the fatty acid amidoamines.

The hardener composition H according to the invention preferably has a specific amount of primary amino groups —$NH_2$, $n(NH_2)/m$, of at least 1 mol/kg (based on the mass m of solids), more preferably of at least 1.5 mol/kg and most preferably of at least 1.8 mol/kg. The specific amount of primary amino groups —$NH_2$ generally does not exceed 10 mol/kg, and is preferably not more than 5 mol/kg.

The hardener composition H of to the invention preferably has a specific amount $n(—NH—CO)/m$ of fatty acid amido groups —NH—CO— in the mass of the hardener composition H (not counting the mass of solvents and diluents and water) of at least 0.10 mol/kg, more preferably of at least 0.20 mol/kg and most preferably of at least 0.25 mol/kg. The specific amount of acid amide groups —NH—CO— generally does not exceed 0.90 mol/kg, and is preferably up to 0.80 mol/kg, more preferably up to 0.75 mol/kg. The amount of amido groups can be measured by NMR spectroscopy.

The hardener composition H according to the invention generally has a low content of volatile amines, i. e., the mass fraction of monomeric amines and low molar mass amines is less than 0.2% as measured by gas chromatography. By low molar mass amines, such amines are meant that have a molar mass of not more than 400 g/mol.

The hardener compositions H of the present invention can be used as hardeners, or curing agents, in two-pack coating compositions, where they are preferably mixed with epoxy resins, in the form of their aqueous dispersions, or in the form of liquid resins which are optionally dissolved or diluted in reactive diluents which are preferably monofunctional epoxide compounds.

Both solvent-borne and water-borne, also referred to as aqueous, two-pack coating compositions can be prepared with the hardener compositions H of the present invention. A "liquid epoxy resin" is an epoxy resin having, on average, at least two epoxide groups per molecule, and which is liquid at room temperature (23° C.), or is dissolved in a liquid diluent.

In preparing water-borne two-pack coating compositions, emulsifiers S are used, and the amount and kind of emulsifiers used in the aqueous dispersion of the hardener composition according to the invention is preferably chosen in a way to allow addition of the epoxy resin E in liquid form, optionally together with reactive diluents, thereby avoiding an additional step of aqueously dispersing the epoxy resin component of the two-pack coating composition.

An aqueous epoxy resin based two-pack coating formulation comprises water, at least one epoxy resin E which is a polymer containing, on average, at least two epoxide groups per molecule, and the hardener composition H as defined hereinabove, or prepared according to any one of the processes as defined hereinabove, and an emulsifier S which is present in either or both of the hardener composition H, and the epoxy resin component E, wherein, if present in the hardener composition H, the emulsifier S is either admixed to the hardener composition H or at least one of its constituents, or is chemically incorporated into at least one of the constituents of the hardener composition H, or is both chemically incorporated, and admixed. The two-pack coating composition thus obtained is formulated to clear-coat paints by adding usual additives, particularly anti-foaming agents, levelling agents, wetting agents, biocides, and rheology modifiers such as thickeners. Pigmented coating compositions can be prepared by grinding the pigment together with a wetting agent, and optionally, further additives such as antisettling agents, as well as those additives mentioned supra, and further optionally, fillers and colourants, in the aqueous dispersion of the hardener composition H of this invention, adding further additives such as preservatives, coalescing agents, and the epoxy resin, either in aqueous dispersion, or in liquid form, optionally together with a reactive diluent, and optionally a further amount of the aqueous dispersion of the hardener composition H of this invention, and adjusting the mixture to the desired viscosity by addition of water. The clear-coat paints or pigmented coating compositions can be applied to the substrates e.g. by spraying, rolling, dipping, flooding, or brushing.

These coating compositions or paints based on an epoxy resin component and the hardener composition H of this invention can be used to form protective coatings on any substrate. Two-pack coating compositions of this invention are particularly useful on mineral substrates such as concrete, stone, and plaster, but can also be used with good success on metal substrates. They provide higher gloss and gloss retention, fast hardness development, good adhesion, and improved mechanical and chemical resistance.

The invention is further illustrated by the following examples.

In the specification, and also in the examples, the following parameters have been used to describe physicochemical properties of the compounds and substances:

The mass fraction of solids $w_s$ was determined by drying a sample B which comprises a substance which is solid at room temperature (23° C.) and is dissolved in a solvent, or dispersed in an aqueous system, with the sample mass of 1 g at 125° C. for one hour, and stating the ratio $m_{Rd}/m_B$ of the mass $m_{Rd}$ of the residue Rd after drying, and the mass $m_B$ of the sample B taken.

Strength of a solution is stated as the mass fraction $w_B$ of solute B in the solution, calculated as the ratio $m_B/m_S$ of the mass $m_B$ of solute B and the mass $m_S$ of solution S.

The specific content of epoxide groups in a sample was determined in the usual way by titration of the sample with tetraethylammonium bromide and perchloric acid in glacial acetic acid, as described by R. R. Jay, Anal. Chem. 36, (1964), pages 667 and 668, and stated as the ratio $n(EP)/m_B$ of the amount of substance n(EP) of epoxide groups present in a sample B, and the mass $m_B$ of that sample B; its customary unit is "mol/kg".

The acid number is defined, according to DIN EN ISO 3682 (DIN 53 402), as the ratio $m_{KOH}/m_S$ of that mass $m_{KOH}$ of potassium hydroxide which is needed to neutralise the sample B under examination, and the mass $m_B$ of this sample B, or the mass $m_B$ of the solids in the sample in the case of a solution or dispersion; its customary unit is "mg/g".

The amine number is defined, according to DIN EN ISO 3771 (DIN 16 945, item 5.6; DIN 53 176) as the ratio $m_{KOH}/m_B$ of that mass $m_{KOH}$ of potassium hydroxide which needs the same amount of acid for neutralisation as the sample B under examination, and the mass $m_B$ of this sample B, or the mass $m_B$ of the solids in the sample in the case of a solution or dispersion; its customary unit is "mg/g". Dynamic viscosity of the dispersion was measured in a cone-and-plate rheometer at 23° C. and a shear rate of 100 $s^{-1}$.

Example 1 Preparation of the Amidoamine Intermediates I1 to I8

Amidoamine Intermediate I1

146 g (1.0 mol) triethylene tetramine (TETA) and 1320 g (1.5 mol) of soy bean oil were charged into a 3 l three-necked vessel, equipped with a thermocouple, a stirrer and a reflux condenser and heated to 100° C. under stirring. This temperature was held for approximately six hours until at least 95% of the primary amino groups had reacted, as monitored by the decrease of the amine number, starting from 153 mg/g. Approximately 1450 g of a fatty acid amidoamine were obtained with an amine number of 78 mg/g measured on a sample drawn from the reaction mass.

Amidoamine Intermediate I2

146 g (1.0 mol) TETA and 886 g (1.0 mol) of linseed oil were charged into a 3 l three-necked vessel, equipped with a thermocouple, a stirrer and a reflux condenser and heated to 100° C. under stirring. This temperature was held for approximately six hours, until at least 95% of the primary amino groups had reacted, as monitored by the decrease of the amine number, starting from 217 mg/g. Approximately 1020 g of a fatty acid amidoamine were obtained with an amine number of 110 mg/g measured on a sample drawn from the reaction mass.

Amidoamine Intermediate I3

146 g (1.0 mol) TETA and 620 g (0.67 mol) of castor oil were charged into a 3 l three-necked vessel, equipped with a thermocouple, a stirrer and a reflux condenser and heated to 100° C. under stirring. This temperature was held for approximately six hours until at least 95% of the primary amino groups had reacted, as monitored by the decrease of the amine number, starting from 292 mg/g. Approximately 750 g of a fatty acid amidoamine was obtained with an amine number of 145 mg/g measured on a sample drawn from the reaction mass.

Amidoamine Intermediate I4

146 g (1.0 mol) TETA and 925 g (1.0 mol) of castor oil were charged into a 3 l three-necked vessel, equipped with a thermocouple, a stirrer and a reflux condenser and heated to 100° C. under stirring. This temperature was held for approximately six hours until at least 95% of the primary amino groups had reacted, as monitored by the decrease of the amine number, starting from 209 mg/g. Approximately 1050 g of a fatty acid amidoamine were obtained with an amine number of 106 mg/g measured on a sample drawn from the reaction mass.

Amidoamine Intermediate I5

146 g (1.0 mol) TETA and 1387 g (1.5 mol) of castor oil were charged into a 3 l three-necked vessel, equipped with a thermocouple, a stirrer and a reflux condenser and heated to 100° C. under stirring. This temperature was held for approximately six hours, until at least 95% of the primary amino groups had reacted, as monitored by the decrease of the amine number, starting from 146 mg/g. Approximately 1510 g of a fatty acid amidoamine was obtained with an amine number of 74 mg/g measured on a sample drawn from the reaction mass.

Amidoamine Intermediate I6

In a 2 l three-necked vessel, equipped with a thermocouple, a stirrer and a reflux condenser with water separator, 146 g (1.0 mol) of TETA were heated to 40° C. under stirring. 560 g (2.0 mol) of tall oil fatty acid were added over fifteen minutes under continuous stirring. When the addition was completed, the reaction mixture was heated within one hour to 150° C., taking advantage of the neutralisation exothermy. Water (36 g=2.0 mol of water) liberated during the reaction was collected in a water collector during three further hours at 180° C. This temperature was held until an amine number of 167 mg/g was reached. 660 g of a brownish, substance were obtained which was highly viscous at room temperature, and had an amine number of 165 mg/g and an acid number of 7 mg/g.

Amidoamine Intermediate I7

A 2l three-necked vessel, equipped with a thermocouple, a stirrer and a reflux condenser with water separator was filled with 630 g (1.0 mol) of a dimer fatty acid (DFA). 206 g (2.0 mol) of diethylenetriamine were added during twenty minutes under stirring. When this addition was completed, 560 g (2.0 mol) of tall oil fatty acid were added and the reaction mixture was heated to 140° C. within one hour, taking advantage of the neutralisation exothermy. The water (72 g=4.0 mol of water) liberated during the reaction was then collected from a water collector during the next five hours, while the temperature was continuously increased to 190° C., while keeping foaming under control. 1320 g of a brownish, pasty substance were obtained which had an amine number of 82 mg/g.

Amine Intermediate I8 (Comparative Example)

In a 1 l three-necked vessel, equipped with a thermocouple, a stirrer and a reflux condenser 116 g (1.0 mol) of HMDA were heated to 80° C. 480 g (2.0 mol) of the glycidyl ester of neodecanoic acid (CE) were added during sixty minutes under stirring, while exothermic temperature increase was not allowed to surpass 90° C. by external cooling. When the addition was completed, the temperature was kept for additional sixty minutes at 90° C. 596 g of a brown, highly viscous substance were obtained which had an amine number of 188 mg/g.

Example 2 Preparation of the Ketimine K1

103 g (1.0 mol) of diethylene triamine (DETA) and 300 g (3 mol) of methylisobutyl ketone (MIBK) were charged into a four-necked flask equipped with a mechanical stirrer, a water separator and a gas inlet and heated to reflux under a slight nitrogen flow. When the desired amount of water had been collected after approximately eight hours (36 g=2.0 mol of water), the excess of MIBK was removed to yield the pure DETA-MIBK-ketimine.

Example 3

Preparation of the Emulsifier E1

195 g of polyethylene glycol (PEG) having a mass average molar mass of 4 kg/mol and 22 g of xylene were charged into a four-necked flask equipped with a mechanical stirrer, a water separator and a gas inlet, and heated to 125° C. When all polyethylene glycol was molten, 11 g of xylene were distilled off under reduced pressure. At 125° C., 0.3 g of a fluoroboric acid solution (aqueous solution with a mass fraction of $HBF_4$ of 50%) were added to the mixture. After this addition, further 11 g of xylene were distilled off under reduced pressure. At 125° C., 19 g of the diglycidyl ether of bisphenol A (BADGE) were added. This temperature was maintained until a dynamic viscosity measured at 23° C. and a shear rate of 25 $s^{-1}$ of 3000 mPa·s was reached. The reaction mixture was cooled to 100° C., and 215 g of water were added. After cooling to room temperature (23° C.) the mass fraction of solids was determined to be 49.5%, and the dynamic viscosity measured at 23° C. and a shear rate of 100 $s^{-1}$ was 3700 mPa·s. No residual epoxide groups were detected, meaning that the specific content of epoxide groups in the sample was lower than the detection limit of 10 mmol/kg (the so-called "epoxy equivalent" was higher than 100 000 g/mol).

Example 4

Preparation of the Epoxy-Amine Adduct A1

2433 g of a liquid epoxy resin EP1 based on bisphenol A diglycidyl ether, having a specific content of epoxide groups of 5.26 mol/kg, 399 g of bisphenol A (1.75 mol) and 800 g of the emulsifier E1 of example 3 were charged into a four-necked vessel, equipped with a mechanical stirrer and a reflux condenser with water separator. The mixture was heated under stirring to 95° C. and water was distilled off under reduced pressure (400 g). Then, 8.5 g of triphenyl phosphine were added and the mixture was heated to 130° C. within one hour. Temperature was kept for two hours while a specific content of epoxide groups of 2.98 mol/kg was reached. The reaction mixture was cooled to 80° C. Then 1335 g of ketimine K1 (5.0 mol) of example 2, 361 g of dibutylamine (2.8 mol) and 1099 g of the amidoamine intermediate I1 (0.75 mol) were added. The temperature was raised to 100° C. and stirring was continued for two hours, where all of the epoxy groups were consumed in the reaction (no residual epoxy groups were detected). The epoxy amine adduct thus obtained was then cooled to 85° C. and directly processed further in the same vessel to prepare the amine-hardener dispersion in example 5. The following further adducts were prepared using the same procedure; the mass of the epoxy resin based on bisphenol A diglycidyl ether was the same in all cases (2433 g), corresponding to an amount of substance of epoxide groups of 6.4 mol.

heating. When the distillation of MIBK had ceased after about one hundred and fifty minutes, the pressure was reduced to about 2 kPa for fifteen minutes at 130° C. in order to remove residual MIBK and water from the product (1620 g distillate, MIBK and water). The mass was allowed to cool to 105° C., then 1926 g of water were added under stirring. The subsequent dispersing step was performed at a high shear rate at 70° C. for two hours. After cooling to 40° C.,

TABLE 1

Epoxy-Amine Adducts A1 to A9

| Adduct | Intermediate 0.75 mol | Ketimine | Emulsifier E1 | Epoxy resin EP1, n(EP) = 6.4 mol | Bisphenol A | dibutyl amine | mass of blocked solid resin |
|---|---|---|---|---|---|---|---|
| A1 | I1; 1099 g | 1335 g; 5.0 mol | 400 g | 2433 g | 399 g; 1.75 mol | 361 g; 2.8 mol | 6027 g |
| A2 | I2; 774 g | 1682 g; 6.3 mol | 400 g | 2433 g | 399 g; 1.75 mol | 193 g; 1.5 mol | 5881 g |
| A3 | I3; 574 g | 1522 g; 5.7 mol | 370 g | 2433 g | 399 g; 1.75 mol | 271 g; 2.1 mol | 5569 g |
| A4 | I4; 803 g | 1335 g; 5.0 mol | 380 g | 2433 g | 399 g; 1.75 mol | 361 g; 2.8 mol | 5711 g |
| A5 | I5; 1150 g | 1522 g; 5.7 mol | 400 g | 2433 g | 399 g; 1.75 mol | 271 g; 2.1 mol | 6175 g |
| A6 | I6; 502 g | 1335 g; 5.0 mol | 360 g | 2433 g | 399 g; 1.75 mol | 361 g; 2.8 mol | 5390 g |
| A7 | I7; 993 g | 1335 g; 5.0 mol | 400 g | 2433 g | 399 g; 1.75 mol | 361 g; 2.8 mol | 5921 g |
| A8* | I8; 447 g | 1335 g; 5.0 mol | 350 g | 2433 g | 399 g; 1.75 mol | 361 g; 2.8 mol | 5325 g |
| A9* | none | 1468 g; 5.5 mol | 340 g | 2433 g | 456 g; 2.0 mol | 426 g; 3.3 mol | 5123 g |

*comparative experiments

Example 5

Preparation of the Amine-Hardener Dispersion D1 from the Adduct A1

At 85° C., 800 g of water were added to the solution of the blocked adduct of example 4 within fifteen minutes under stirring. After stirring at 75° C. for thirty minutes, the temperature control was set to 130° C. and the liberated blocking agent MIBK was distilled off under continuous the product was further diluted with 5350 g of water within thirty minutes, and allowed to cool to room temperature. The milky dispersion obtained had a mass fraction of solids of 41.5% and a dynamic viscosity of 850 mPa·s (measured at a shear rate 100 s$^{-1}$ and 23° C.). The calculated specific content $n(NH_2)/m$ of amino groups —$NH_2$ in the solid resin was 1.92 mol/kg ("NH-equivalent weight" of 254 g/mol, based on solid resin). The Z-average particle size of the dispersion, as determined by dynamic light scattering, was 470 nm.

TABLE 2

Hardeners D1 to D9 made from the Epoxy-Amine Adducts A1 to A9

| Hardener Dispersion | total mass of solid deblocked adduct | specific amine group content $n(NH_2)/m$ | mass fraction of solids | dynamic viscosity of dispersion | average particle size $D_z$ | "NH equivalent weight" |
|---|---|---|---|---|---|---|
| D1 | 5207 g | 1.92 mol/kg | 41.5% | 850 mPa · s | 470 nm | 260 g/mol |
| D2 | 4848 g | 2.60 mol/kg | 42.4% | 412 mPa · s | 941 nm | 192 g/mol |
| D3 | 4634 g | 2.46 mol/kg | 41.0% | 1230 mPa · s | 719 nm | 203 g/mol |
| D4 | 4891 g | 2.04 mol/kg | 39.7% | 999 mPa · s | 420 nm | 244 g/mol |
| D5 | 5240 g | 2.16 mol/kg | 41.5% | 1350 mPa · s | 763 nm | 230 g/mol |

TABLE 2-continued

Hardeners D1 to D9 made from the Epoxy-Amine Adducts A1 to A9

| Hardener Dispersion | total mass of solid deblocked adduct | specific amine group content $n(NH_2)/m$ | mass fraction of solids | dynamic viscosity of dispersion | average particle size $D_z$ | "NH equivalent weight" |
|---|---|---|---|---|---|---|
| D6 | 4570 g | 2.19 mol/kg | 39.3% | 1877 mPa · s | 287 nm | 228 g/mol |
| D7 | 5101 g | 1.96 mol/kg | 40.7% | 1512 mPa · s | 573 nm | 255 g/mol |
| D8 * | 4505 g | 2.22 mol/kg | 41.8% | 1760 mPa · s | 1200 nm | 225 g/mol |
| D9 * | 4221 g | 2.61 mol/kg | 39.3% | 1566 mPa · s | 1150 nm | 192 g/mol |

* comparative experiments

Abbreviations and Data (Molar Mass M)

TETA triethylenetetramine, M=146 g/mol
HMDA hexamethylenediamine (1,6-diaminohexane), M=116 g/mol
CE ®Cardura E10 P, glycidylester of ®Versatic acid (neodecanoic acid, a highly alpha-branched saturated alkanoic acid), M=240 g/mol
linseed oil M=886 g/mol (calculated)
soy bean oil M=880 g/mol (calculated)
tall oil fatty acid M=280 g/mol (calculated)
bisphenol A M=228 g/mol
EP1 epoxy resin based on bisphenol A diglycidylether, M=380 g/mol
DFA commercial dimer fatty acid (®Pripol 1017, Croda), M=630 g/mol
castor oil M=925 g/mol (calculated)
PEG polyethylene glycol, mass average molar mass $M_w$=4000 g/mol
dibutylamine M=129 g/mol Example 6 Clear Coat Testing on Glass Plates Mixtures were prepared from the dispersions D1 through D9 with an epoxy resin solution L (bisphenol A diglycidyl ether based epoxy resin EP1, in para-tert-butylphenyl glycidylether as reactive diluent, mass fraction of EP1 in the solution is 70%; specific content of epoxy groups EP in the solution n(EP)/m(L)=5.13 mol/kg) in stoichiometric ratio, i. e. n(EP)=2×n(NH_2), with addition of a wetting and defoaming agent (®Surfynol SE-F, Air Products). Immediately after mixing, the clear coating compositions were applied to clean glass panels in a wet film thickness of 200 μm.

TABLE 3

Composition of the Clear Coating Binders CC1 to CC9

| Binder | Hardener Dispersion D | mass of hardener dispersion | mass of epoxy resin solution L | mass of wetting and defoaming agent |
|---|---|---|---|---|
| CC1 | D1 | 80.2 g | 25.0 g | 0.2 g |
| CC2 | D2 | 58.1 g | 25.0 g | 0.2 g |
| CC3 | D3 | 63.5 g | 25.0 g | 0.2 g |
| CC4 | D4 | 78.9 g | 25.0 g | 0.2 g |
| CC5 | D5 | 71.0 g | 25.0 g | 0.2 g |
| CC6 | D6 | 74.3 g | 25.0 g | 0.2 g |
| CC7 | D7 | 80.2 g | 25.0 g | 0.2 g |
| CC8* | D8 | 69.0 g | 25.0 g | 0.2 g |
| CC9* | D9 | 62.6 g | 25.0 g | 0.2 g |

*comparative experiments

The following results were found for the coating films:

TABLE 4

Test Results of Two-Pack Epoxy Resin Coatings

|  |  | CC1 | CC2 | CC3 | CC4 | CC5 | CC6 | CC7 | CC8* | CC9* |
|---|---|---|---|---|---|---|---|---|---|---|
| Turbidity | Rk | 2 | 1 | 1 | 1 |  | 3 | 2 | 4 | 4 |
| Dustfree drying time | h | 4.5 | 2 | 1.5 | 2.5 | 4.5 | 1 | 2 | 1.5 | 1 |
| Tackfree drying time | h | 8 | 6 | 5 | 6 | 8 | 4.5 | 6 | 4.5 | 4 |
| H (24 h) | s | 66 | 120 | 128 | 112 | 76 | 145 | 87 | 104 | 15 |
| H (48 h) | s | 76 | 144 | 166 | 134 | 88 | 157 | 96 | 108 | 29 |
| H (7 d) | s | 103 | 182 | 176 | 178 | 114 | 179 | 162 | 163 | 72 |
| H (14 d) | s | 145 | 188 | 190 | 196 | 155 | 281 | 166 | 178 | 96 |
| AW |  | OK | OK | OK | OK | OK | OK | OK | OK | D |
| HzW | Rk | 3 | 1 | 2 | 1..2 | 2 | 3 | 2 | 4 | 2 |
| HW | s | 76 | 128 | 158 | 123 | 85 | 124 | 94 | 121 | 23 |
| ΔHW | % | 26 | 30 | 0 | 31 | 26 | 31 | 42 | 26 | 68 |

*comparative experiments

| Rk | ranking from 0 to 5: 0 is good, 5 is bad, 3 is still acceptable |
| H(time) | is the pendulum hardness measured according to the method of König (DIN 55945) on a coated glass plate after the time of storage (in hours "h" or days "d") at 23° C. as indicated in the parentheses |
| AW | is the adhesion on a glass plate substrate measured after immersion in water at 23° C. for 24 h (twenty-four hours), possible ratings are "OK" - no delamination seen, or "D" - at least partial delamination |
| HzW | is the haze measured after immersion of the glass plate in water at 23° C. for 24 h (twenty-four hours); 0 = clear, no haze; 5 = opaque, strong haze; 3 = medium haze |
| HW | is the pendulum hardness measured on a glass plate substrate stored before the test for seven days at 23° C., after immersion of the glass plate in water at 23° C. for 24 h (twenty-four hours) |
| ΔHW | is the relative difference [H(7 d) − HW]/H(7 d) * 100% |

Results for chemical resistance and for gloss are summaries in the following table.

TABLE 5

Test Results of Two-Pack Epoxy Resin Coatings

|  |  | CCB1 | CCB2 | CCB3 | CCB4 | CCB5 | CCB6 | CCB7 | CCB8* | CCB9* |
|---|---|---|---|---|---|---|---|---|---|---|
| Ethanol | min | 10 | 25 | 10 | 25 | 25 | 15 | 10 | 5 | 5 |
| Cleaner [1] | Rk | 2 | 1 | 2 | 0 | 1 | 2 | 2 | 3 | 4 |
| Cleaner [2] | Rk | 2 | 1 | 2 | 1 | 2 | 2 | 3 | 4 | 5 |
| Detergent [1] | Rk | 1 | 0 | 2 | 0 | 1 | 1 | 1 | 3 | 4 |
| Detergent [2] | Rk | 1 | 0 | 2 | 1 | 2 | 1 | 1 | 4 | 5 |
| Vinegar | Rk | 1 | 1 | 2 | 2 | 1 | 2 | 3 | 4 | 4 |
| Gloss 0 h | GU | 76 | 85 | 86 | 93 | 82 | 68 | 58 | 60 | 20 |
| Gloss 0.5 h | GU | 81 | 90 | 75 | 95 | 83 | 68 | 42 | 46 | 10 |
| Gloss 1 h | GU | 79 | 91 | 71 | 91 | 85 | 64 | 32 | 46 | 9 |
| Gloss 1.5 h | GU | 79 | 78 | 63 | 77 | 81 | 22 | 32 | 46 | 10 |
| Gloss 2 h | GU | 70 | 71 | n.m. | 68 | 72 | n.m. | 36 | 33 | 5 |
| Gloss 3 h | GU | 55 | 65 | n.m. | 61 | 61 | n.m. | n.m. | 38 | 2 |

*comparative experiments

Chemical Resistance is recorded in the rows marked with

| "ethanol" | time after which the coating film can be scratched from the coated surface of a glass plate upon immersion in ethanol at 23° C. |
|---|---|
| "cleaner" | haze developed after immersion for one hour ([1]) and for two hours ([2]) in a commercial glass cleaner "Tanet" obtained from Werner & Mertz Professional Vertriebs-GmbH, comprising the following ingredients (substance and mass fraction in the cleaner solution): 1-butoxypropane-2-ol (3.5 ± 1.5)%; propane-2-ol (3.5 ± 1.5)%; 1-methoxypropane-2-ol (3.5 ± 1.5)%; aqueous ammonia; anionic surfactant; rating as supra |
| "detergent" | haze developed after immersion for one hour ([1]) and for two hours ([2]) in a commercial household detergent "Meister Proper", obtained from Procter & Gamble Austria GmbH, comprising the following ingredients (substance and mass fraction in the detergent solution): ethoxylated aliphatic $C_9$- to $C_{11}$-alcohols (3 ± 2)%; aqueous ammonia; rating as supra |
| "vinegar" | haze developed after immersion for one hour in a table vinegar having a mass fraction of acetic acid of 7.1%, rating as supra. |
| Gloss | was measured in time intervals as defined, from immediately after mixing (0 h) until three hours (3 h) after mixing the components of the clear coating composition, with a tri-gloss instrument according to ISO 2813 (DIN 67 530) at an angle of 60° (and at 20° for gloss higher than 70 Gloss Units ("GU"), according to the standard). Gloss units are based on a reference value of a polished black glass tile which is defined as 100 GU. For subsequent coating lanes alongside the first one painted in a large area, it is imperative to have minimum deviation in gloss from one lane to an adjacent lane. "n.m." stands for "not measured". |

It can be seen from the tables that the hardness development is much faster, and reaches a higher level if fatty acid amidoamines are added (D1 to D7 versus D9) or if an elastic amine is added (D8 versus D9). Chemical resistance is better for fatty acid amidoamine addition than in both comparison examples (elastic amine, no addition). The initial gloss is higher, and gloss retention is better for added fatty acid amidoamine (D1 to D7) and elastic amine addition (D8), while the coating of comparison example D9 has low initial gloss, and drops to almost zero. Gloss retention over the use time (pot life) of a paint is important in painting large areas, see supra. Such favourable gloss retention is surprising and could not have been expected from any prior art document.

Example 7 Pigmented Coatings 7.1 Pigment Paste P71

A pigment paste P71 was prepared by charging in this sequence, 15.9 kg of deionised water, 8.5 kg of a polymeric non-ionic wetting and dispersing agent dissolved in water-compatible solvents (Additol® VXW 6208/60, ALLNEX Austria GmbH), 0.4 g of a defoamer based on a mixture of hydrocarbons and hydrophic solid particles (Additol® VXW 6211, ALLNEX Austria GmbH), mixing these until a homogeneous mixture is formed, adding thereto in this sequence, 10.0 kg of a talc (®Talkum AT 1, Omya), 29.2 kg of a white titanium dioxide pigment (Kronos® 2059, Kronos International Inc.), 19.3 kg of a barium sulfate pigment having a median of particle size $d_{50}$=3 μm (EWO®, Deutsche Baryt Industrie), 10.6 kg of a yellow iron oxide pigment (Bayferrox® 3920, Lanxess Deutschland GmbH), 2.7 kg of a black iron oxide pigment (Bayferrox® 306, Lanxess Deutschland GmbH), 1.3 kg of a yellow quinophthalone pigment (Paliotol® yellow L 0962, BASF SE), 1.3 kg of a green phthalocyanine pigment (Hostaperm® green 8G, Clariant International), and 0.2 kg of a coalescing agent (2,2,4-trimethyl-1,3-pentanediol-monoisobutyrate, ®Texanol, Eastman Chemical Company), dispersing this mixture on a bead mill for about sixty minutes at a temperature not exceeding 40° C., and then adding 0.5 kg of a polyurethane thickener (Additol® 6388, ALLNEX Austria GmbH), and dispersing for three further minutes. This pigment paste P71 had the following properties:

mass fraction of pigments: 74% mass ratio of dispersing agent to pigment: 11.5 cg/g (=115 g/kg)

dynamic viscosity (DIN EN ISO 3219, 23° C., 25 s'): 2500 mPa·s

Mixtures PH1, PH2, and PH3 were prepared by mixing the pigment paste P71 of example 7.1 with hardener dispersions D5, D6, and D7 as listed in Table 6:

TABLE 6

Mass of constituents in Pigment Paste/Hardener Mixtures PH1, PH2 and PH3

| | Component | | | |
|---|---|---|---|---|
| mass m of component | P71 m(P71)/g | D5 m(D5)/g | D6 m(D6)/g | D7 m(D7)/g |
| PH1 | 30.0 | 46.3 | | |
| PH2 | 30.0 | | 50.5 | |
| PH3 | 30.0 | | | 48.1 |

An epoxy resin solution L (bisphenol A diglycidyl ether based epoxy resin EP1, in para-tert-butylphenyl glycidylether as reactive diluent, mass fraction of EP1 in the solution is 70%; specific content of epoxy groups EP in the solution n(EP)/m(L)=5.13 mol/kg) was then added to these mixtures PH1, PH2, and PH3, and the resulting pigmented paint compositions PPC1, PPC2, and PPC3 were adjusted to a mass fraction of solids (pigments and binder solids) of 60% by adding further deionised water, according to table 7:

TABLE 7

Pigmented Paint Compositions PPC1, PPC2, and PPC3

| | Pigmented Paint Composition | | |
|---|---|---|---|
| Pigment Paste/Hardener Mixture M | PPC1 PH1 | PPC2 PH2 | PPC3 PH3 |
| m (PH1)/g | 76.3 | | |
| m (PH2)/g | | 80.5 | |
| m (PH3)/g | | | 78.1 |
| m (L)/g | 16.3 | 17.0 | 15.0 |
| m (H$_2$O)/g | 35.9 | 34.2 | 34.6 |

These coating compositions were applied by spraying on glass plates and dried for seven days at room temperature (23° C.) and 50% relative humidity to yield dry film thicknesses of 200 μm. The results are listed in Table 8.

TABLE 8

Test Data for Pigmented Coatings

| | | PB 5 | PB 6 | PB 7 |
|---|---|---|---|---|
| Paint viscosity | mPa · s | 1703 | 1895 | 2188 |
| Pot life | h | 3 | 2 | 3 |
| Gloss (60° angle, after 0.5 h) | GU | 90 | 65 | 80 |
| Dust-free dry time | h | 4 | 1 | 1, 5 |
| Tack-free dry time | h | 7 | 4, 5 | 6 |
| Hardness development | | | | |
| H (24 h) | s | 32 | 112 | 65 |
| H (7 d) | s | 98 | 124 | 118 |
| Water immersion test | | | | |
| AW | | OK | OK | OK |
| HW | s | 88 | 72 | 97 |
| ΔHW | % | 90 | 58 | 82 |
| Chemical resistance (after 7 d drying time) | | | | |
| Ethanol | min | 30 | 18 | 25 |
| Vinegar | R | 1 | 2 | 1 |
| Cleaner [2] | R | 1 | 2 | 2 |

Testing was made as described in example 6, see also explanations below tables 4 and 5.

When the viscosity of the paint upon storage had reached twice its initial value after preparation, this time span was considered as the pot life.

It can be seen from these data that paints with an fatty acid amidoamine addition product based on oils, which mandatorily also comprise the corresponding mixture of mono-glycerides and di-glycerides produced during reaction of an oil with the amine component having both primary and secondary amino groups, exhibit a delayed hardness development, but offer superior gloss and chemical resistance, when compared to paints with fatty acid amidoamines made from fatty acids with the amine component.

The invention claimed is:

1. A hardener composition H for an epoxy resin based two-pack coating formulation, wherein the hardeners of the hardener composition H are prepared by reacting a mixture of a blocked amine A4B and a fatty acid amidoamine A3F with an at least difunctional organic compound C having functional groups that are reactive versus secondary amino groups, to form a mixed addition or condensation product and the hardener composition H comprises:
   moieties M1 having at least one structural element of formula 1

Formula 1 and
   moieties M2 having at least one structural element of formula 2

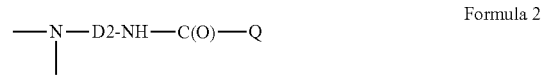

Formula 2 wherein
each of D1 and D2 is, independently of each other, a diyl group of formula 3

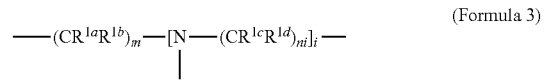

(Formula 3)

where m and all ni are, independently, integer numbers from two to twelve, and i is an integer number of from zero to ten, $R^{1a}$, $R^{1b}$, $R^{1c}$ and $R^{1d}$ are independently of each other and separately for each m and ni, selected from the group consisting of H, and optionally substituted linear or branched alkyl groups having from one to six carbon atoms, or may form a ring, and
Q is a univalent group which is an optionally substituted linear or branched alkyl group or alkenyl group having from five to thirty-nine carbon atoms.

2. The hardener composition H of claim 1 wherein in at least one of D1 and D2, m and all ni are, independently, integer numbers from two to six, and i is an integer number of from zero to three.

3. The hardener composition H of claim 2 wherein in at least one of D1 and D2, $R^{1a}$, $R^{1b}$, $R^{1c}$ and $R^{1d}$ are all H.

4. The hardener composition H according to claim 1 wherein either or both of the following conditions are met:
   (a) the moieties M1 are derived from amines A4 having from two to twenty-four carbon atoms, and at least one primary amino group, and at least one secondary amino group, and (b) the moieties M2 are derived from amines A3 having from two to twenty-four carbon atoms, and at least one primary amino group, and at least one secondary amino group.

5. The hardener composition H according to claim 4 wherein either or both of the following conditions are met:
(a) the amines A4 are aminoalkyleneimines A41 of formula 5

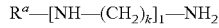

$$R^a\text{—}[NH\text{—}(CH_2)_k]_l\text{—}NH_2 \quad \text{(Formula 5)},$$

where $R^a$ is H or an organic group, k is an integer number of from 2 to 12, and l is an integer number of from 1 to 11, and
(b) the amines A3 are, independently from the choice for amines A4, aminoalkyleneimines A31 of formula 5.

6. The hardener composition H according to claim 5 wherein either or both of the following conditions are met:
(a) the amines A4 are diaminoalkyleneimines A42 of formula 5 wherein $R^a$ is H, and
(b) the amines A3 are, independently from the choice for amines A4, diamino-alkyleneimines A32 of formula 5 wherein $R^a$ is H.

7. The hardener composition H according to claim 6 wherein either or both of the following conditions are met:
(a) the amines A4 are diaminoalkyleneimines A42 selected from the group consisting of diethylenetriamine, triethylenetetramine, tetraethylenepentamine, 1,5-diamino-2,4-dimethyl-3-azapentane and its isomers, 1,7-diamino-4-azaheptane, 1,9-diamino-5-azanonane, 1,14-diamino -5,10-diaza-tetradecane, 1,13-diamino-7-azatridecane, and 1,20-diamino-7,14-diazaeicosane, and mixtures of any of these, and
(b) the amines A3 are diaminoalkyleneimines A32 selected, independently from the choice for amines A42, from the group consisting of diethylenetriamine, triethylenetetramine, tetraethylene pent-amine, 1,5-diamino-2,4-dimethyl-3-azapentane and its isomers, 1,7-diamino- 4-azaheptane, 1,9-diamino-5-azanonane, 1,14-diamino-5,10-diazatetradecane, 1,13-diamino-7-azatridecane, and 1,20-diamino-7,14-diazaeicosane, and mixtures of any of these.

8. The hardener composition H according to claim 4 wherein A4 is a di-primary mono-secondary amine and A3 is a di-primary di-secondary amine.

9. A process for the preparation of the hardener composition H according to claim 1 by a multi-step process, comprising
a step (step (a)) preparing a fatty acid amidoamine A3F from amines A3 having from two to twenty-four carbon atoms, and at least one primary amino group, and at least one secondary amino group, and a fatty acid F which is an aliphatic linear or branched carboxylic acid having at least one carboxyl group per molecule, or a fat or a fatty oil, both individually or collectively abbreviated as "O", which fat or fatty oil O is substantially a triglyceride $F_3G$, i. e. a tri-ester of glycerol G and three molecules of fatty acids F which may be the same in each of the ester bonds, or may be different, under formation of fatty acid amide A3F, and concurrent formation of glycerides of fatty acid F which comprise at least one of a diglyceride $F_2G$ which is an ester of glycerol G with two molecules of fatty acid F, a monoglyceride $F_1G$ which is an ester of glycerol G with one molecule of fatty acid F, and glycerol G, or mixtures thereof,
a separate step (step (b)) preparing a blocked amine A4B which has a Schiff base structure >C=N— from amines A4 having from two to twenty-four carbon atoms, and at least one primary amino group, and at least one secondary amino group, and a blocking agent B which is a carbonyl functional compound selected from aldehydes and ketones or mixtures of these, under consumption of the primary amino group,
a step (step (c)) wherein the amidoamine AF3 and the blocked amine A4B are reacted with a compound C which is an organic compound which has at least one reactive group selected from the group consisting of acylesters, acylanhydrides, isocyanates, epoxides, cyclocarbonates, and aziridines, under reaction thereof with a secondary amino group of the amidoamine AF3 and the blocked amine A4B, and
a step (step (d)) wherein the blocking agent B is removed such that primary amino groups are liberated.

10. The process of claim 9 wherein in step (a), the stoichiometry is chosen such that the ratio of the amount of substance $n(NH_2)$ of primary amino groups in the amine A3 to the amount of substance of carboxyl groups $n(COOH)$ in the fatty acids F present as such, or in the form of their glycerides, is between 0.9 mol/mol and 1.0 mol/mol, to obtain a fatty acid amide A3F having at least one secondary amino group >NH and where all primary amino groups of the amine A3 are converted to amido groups —CO—NH—.

11. The process of claim 9, wherein in step (b), the stoichiometry in this reaction step is chosen such that the number of carbonyl groups in the blocking agent B is at least equal to the number of primary amino groups —$NH_2$ in the amine A4.

12. The process of claim 9, wherein the blocked amine A4B of step (b) is reacted in a separate reaction step (c') with a compound C1 which has at least one reactive group selected from the group consisting of acylester, acyl-anhydride, isocyanate, epoxide, cyclocarbonate, and aziridine, under formation of an adduct A4BC1 that has blocked primary amino groups, and wherein the stoichiometry in this reaction step is chosen such that the ratio of the amount of substance of reactive groups in compound C1 and the amount of substance of secondary amino groups in the amine A4 is between 1 mol/mol and 1.1 mol/mol, under formation of an adduct A4BC1 that has at least one blocked primary amino group in the form of a Schiff base structure >C=N—, and wherein the acid amide A3F of step (a) is reacted in a separate reaction step (c") with a compound C2 which has at least one reactive group selected from the group consisting of acylester, acylanhydride, isocyanate, epoxide, cyclocarbonate, and aziridine, and wherein the stoichiometry in this reaction step is chosen such that the ratio of the amount of substance of reactive groups in compound C2 and the amount of substance of secondary amino groups in the amine A3 is between 0.9 mol/mol and 1.1 mol/mol, under formation of an adduct A3FC2 that has at least one fatty acid amide group —CO—NH—, wherein C1 and C2 may be different, or may be the same, and wherein the adducts A4BC1 and A3FC2 so formed are combined.

13. The process of claim 9, wherein an emulsifier S is added in at least one of the process steps.

14. The hardener composition H according to claim 1, which comprises at least one selected from the group consisting of diglycerides $F_2G$, monoglycerides $F_1G$, and glycerol, or the reaction products of at least one selected from the group consisting of diglycerides $F_2G$ and monoglycerides $F_1G$ and glycerol with at least one selected from the group consisting of compounds C, C1, and C2, wherein compounds C, C1, and C2 have at least one reactive group selected from the group consisting of acylester, acylanhydride, isocyanate, epoxide, cyclocarbonate, and aziridine.

15. An aqueous epoxy resin based two-pack coating formulation comprising:
   water,
   at least one epoxy resin E which is a polymer containing, on average, at least two epoxide groups per molecule, and
   the hardener composition H of claim 1, and
   an emulsifier S which is present in either or both of the hardener composition H, and the epoxy resin component E, wherein, if present in the hardener composition H, the emulsifier S is either admixed to the hardener composition H or at least one of its constituents, or is chemically incorporated into at least one of the constituents of the hardener composition H, or is both chemically incorporated, and admixed.

16. A method of use of the aqueous epoxy resin based two-pack coating formulations of claim 15 in coating of substrates, comprising the steps of
   admixing to the coating formulations at least one of additives selected from the group consisting of antifoaming agents, levelling agents, wetting agents, biocides, and rheology modifiers,
   optionally admixing a pigment paste and further additives selected from the group consisting of antisettling agents, preservatives, coalescing agents, and anti-corrosion additives, and further optionally, fillers and colourants, and
   applying the mixture to a substrate by spraying, rolling, dipping, flooding, or brushing, wherein
   the substrate is selected from the group consisting of metals, and mineral substrates selected from the group consisting of concrete, plaster, and stone.

\* \* \* \* \*